United States Patent
Fukazawa

(10) Patent No.: US 8,605,360 B2
(45) Date of Patent: Dec. 10, 2013

(54) PLASTIC LENS, AND MOLDING METHOD AND MOLDING MOLD THEREFOR

(75) Inventor: Motohiro Fukazawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 533 days.

(21) Appl. No.: 12/860,453

(22) Filed: Aug. 20, 2010

(65) Prior Publication Data

US 2011/0199688 A1 Aug. 18, 2011

(30) Foreign Application Priority Data

Feb. 15, 2010 (JP) ................. 2010-030066

(51) Int. Cl.
| | |
|---|---|
| G02B 3/00 | (2006.01) |
| G02B 7/00 | (2006.01) |
| G02B 9/00 | (2006.01) |
| G02B 11/00 | (2006.01) |
| G02B 13/00 | (2006.01) |
| G02B 15/00 | (2006.01) |
| G02B 17/00 | (2006.01) |
| G02B 25/00 | (2006.01) |

(52) U.S. Cl.
USPC ......................................... 359/642

(58) Field of Classification Search
USPC .................................. 359/619–642
See application file for complete search history.

(56) References Cited

FOREIGN PATENT DOCUMENTS

| | | | |
|---|---|---|---|
| JP | 6-160747 A | 6/1994 | |
| JP | 2004/122751 | * 4/2004 | ............... G02B 1/04 |
| JP | 3814591 B2 | 8/2006 | |

* cited by examiner

*Primary Examiner* — Thomas K Pham
*Assistant Examiner* — Brandi Thomas
(74) *Attorney, Agent, or Firm* — Fitzpatrick, Cella, Harper & Scinto

(57) ABSTRACT

Provided is a plastic lens molded with a mold includes: an optical surface formed of an incident/output surface in a rectangular shape formed in a direction orthogonal to an optical axis; a long side surface portion that is a side surface in a longitudinal direction adjacent to the optical surface; at least one positioning reference portion as a positioning reference for positioning the plastic lens with respect to another member, formed on the long side surface portion; a gate-side short side surface portion with an injection port for a resin formed therein; an anti-gate side short side surface portion positioned on an opposite side of the gate-side short side surface portion; and a deflection suppressing shape portion in one of a convex shape and a concave shape formed on the anti-gate side short side surface portion.

8 Claims, 8 Drawing Sheets

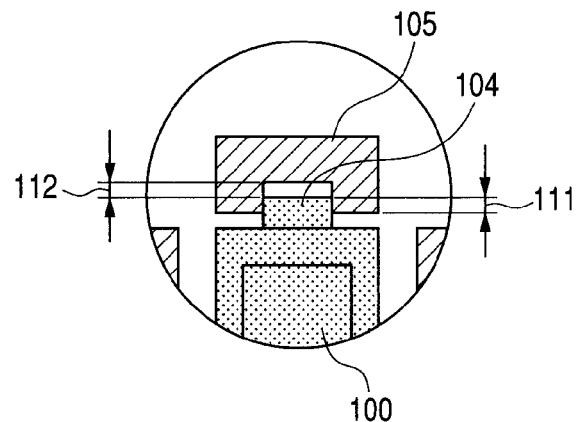
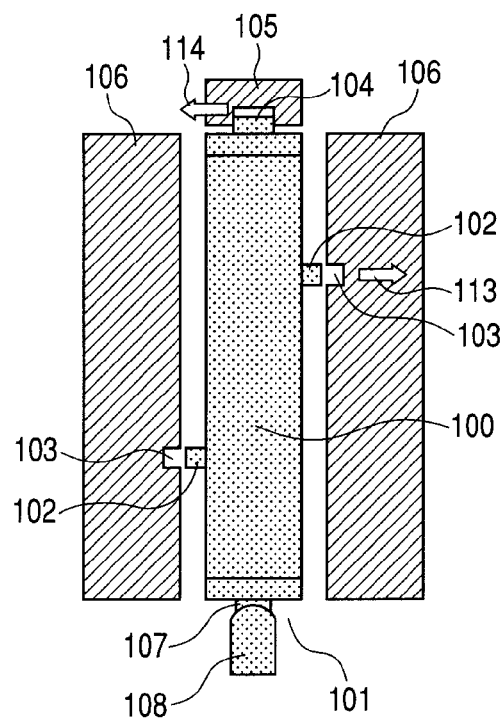
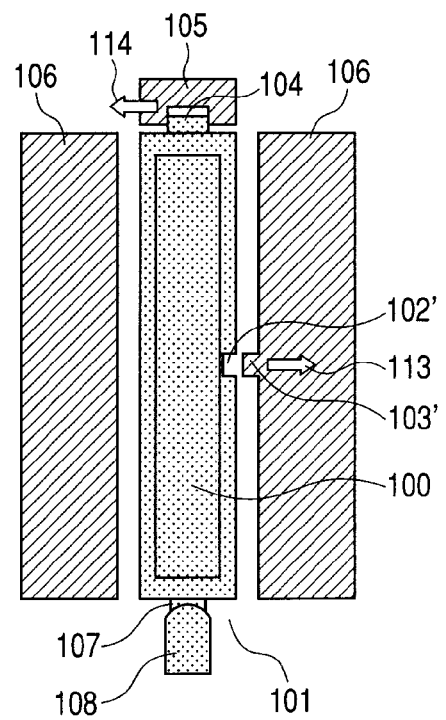

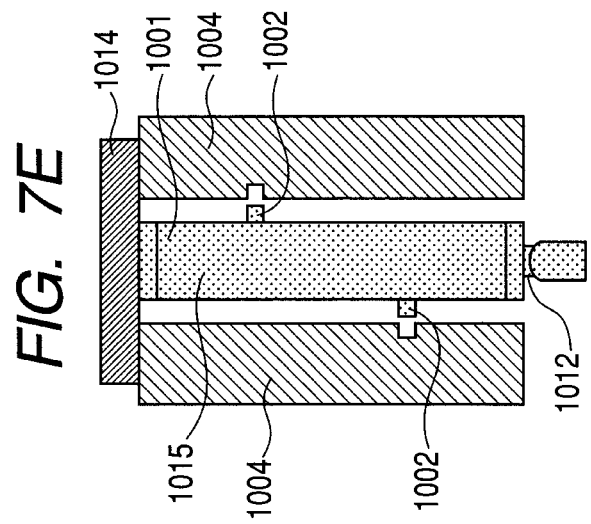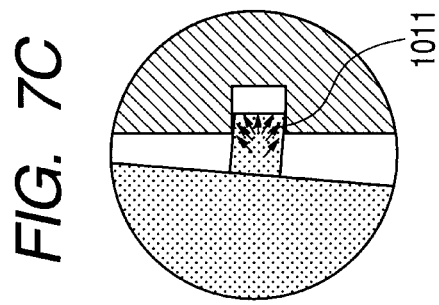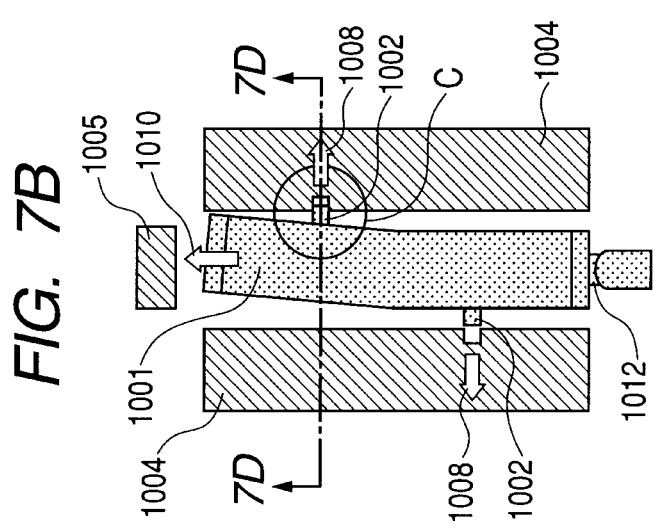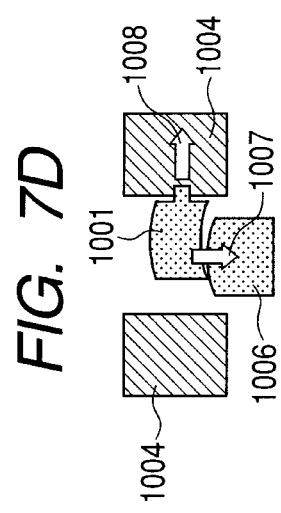

PLASTIC LENS, AND MOLDING METHOD AND MOLDING MOLD THEREFOR

BACKGROUND OF THE INVENTION

1. Field of the Invention

The present invention relates to a plastic lens such as an fθ lens molded with a molding mold member, using plastic as a material, and a molding mold therefor.

In particular, the present invention relates to a technology of preventing optical characteristics of an fθ lens used in a scanning optical system of an image recording apparatus such as a color laser printer or a color copier from being impaired in molding with a mold.

2. Description of the Related Art

Conventionally, in a scanning optical apparatus used in a laser printer or a digital copier, an imaging optical system having fθ characteristics is used as a scanning optical system when a light beam from a light source is scanned by a light deflector and focused in a spot shape on an image-forming surface on a photosensitive drum.

The fθ lens needs to have a shape portion as a reference for positioning in a longitudinal direction with respect to a scanning optical apparatus body.

Therefore, in an fθ lens 801 having a gate portion 803 as illustrated in FIG. 6A, a convex portion 802 as a shape portion of a positioning reference is formed in a direction parallel to a direction of an optical axis 806 and meshed with to a reference receiving portion 804 of a scanning optical apparatus 809 as illustrated in FIG. 6B.

Further, as illustrated in FIG. 6C, in order to prevent a parting line from being complicated and suppressing a mold production cost, there is known an fθ lens in which a convex portion 805 of the positioning reference is provided in a direction orthogonal to the optical axis 806 (see Japanese Patent Application Laid-Open No. H06-160747).

In such an fθ lens, as illustrated in FIG. 6C, the convex portion 805 as a positioning reference is provided in a longitudinal side surface portion of the lens, and the convex portion 805 is fitted in the reference receiving portion 804 of the scanning optical apparatus 80 as illustrated in FIG. 6D, and thus, positioning of the fθ lens in the longitudinal direction is performed.

It is preferred that positioning in the longitudinal direction in the fθ lens be performed in the vicinity of the lens optical axis 806 for adjusting the optical characteristics.

However, when only one convex portion as a positioning reference is formed on the longitudinal side surface portion of the lens as described above, the convex portions as a reference may interfere with each other between lenses during the storage of produced lenses and during accommodation of jigs used for attachment to the scanning optical apparatus.

Therefore, a twist is caused in the jig, which is not preferred for smooth attachment to the scanning optical apparatus. As a configuration solving this problem, the arrangement in which the convex portions 805 as a positioning reference are placed in a staggered manner as illustrated in FIG. 6E has been developed.

Further, in order to prevent the interference between the lenses, the arrangement in which the convex portion is replaced by a concave portion has been developed.

The positioning reference of the convex portion or the concave portion placed on the side surface of the fθ lens is shaped by side surface forming slide blocks.

At this time, the fθ lens generally has a thick and deflected shape in terms of a function.

Therefore, a high molding pressure is required for molding so that sink is not formed in the thick portion.

As a result, the positioning reference portion in a convex or concave shape as a small and fine shape described above is supplied with a pressure more than necessary for forming, and the engagement force with the slide blocks for forming the positioning reference shape increases.

Therefore, the fθ lens molded at a time of opening of the slide blocks during releasing has its positioning reference shape deflected in the side surface direction with the gate to be fixed by a runner and a spool being a fulcrum, which causes mold releasing from a cavity forming portion on a movable side.

Consequently, formation defects such as abrasion involved in mold releasing from the cavity forming portion of a movable side mold and fracture of the positioning reference itself are caused.

Conventionally, Japanese Patent No. 3814591 proposes that the above-mentioned releasing defect is avoided with respect to the arrangement in which the convex portion of the positioning reference is formed in parallel with the optical axis direction as illustrated in FIG. 6A.

In Japanese Patent No. 3814591, a shape portion for restricting the expansion during releasing is placed at an end portion on a side opposite to the gate in the longitudinal direction of the fθ lens as countermeasures.

More specifically, the fθ lens that is long in one direction expands in the longitudinal direction during releasing. Therefore, when the convex portion as a positioning reference is released from a mold cavity portion, a large force is applied to the convex portion, and an eclipse is caused in the convex portion due to the releasing defects.

As illustrated in FIG. 6F, Japanese Patent No. 3814591 adopts a configuration in which, as a shape portion for restricting the expansion during releasing, a convex portion 811 protruding in a direction parallel to the convex portion 802 as a positioning reference or a concave portion 812 receding in the direction is formed in an end portion on a side opposite to the gate in the longitudinal direction of the fθ lens.

Due to this configuration, the force expanding in the longitudinal direction is received, and an eclipse is avoided.

However, the above-mentioned conventional examples have the following problems.

In Japanese Patent No. 3814591, the deflection in the lens side surface direction caused by the engagement with the slide blocks forming the positioning reference cannot be avoided.

Therefore, it is difficult to avoid the problems caused by releasing defects such as an eclipse, peeling, and tearing with respect to the positioning reference caused by the deflection.

Further, in the arrangement in which a convex or concave positioning reference portion is placed on an upper lens side surface, which is different from the arrangement in which a convex portion of a positioning reference is formed in parallel with the optical axis direction as in Japanese Patent No. 3814591, the following problems newly arise.

The factors of the deflection in the fθ lens side surface direction are described with reference to FIGS. 7A to 7E.

Before describing the deflection, the outline for the molding with a mold for such an fθ lens is described with reference to FIG. 7A.

As illustrated in FIG. 7A, a resin injected from a plasticizing apparatus 910 flows through a spool 909, a runner 908, and a gate 907 to fill a lens cavity 901, and a cavity shape is transferred with a molding force added from the plasticizing apparatus.

FIG. 7B is a cross-sectional view taken along the line 7B-7B of FIG. 7A during releasing. FIG. 7C is an enlarged view of a C portion of FIG. 7B, and FIG. 7D is a cross-sectional view taken along the line 7D-7D of FIG. 7B.

A convex portion 1002 as a positioning reference placed on a lens side surface is formed by slide blocks 1004 as illustrated in FIG. 7B. A thick molding such as an fθ lens requires a high dwell force so that sink is not formed in the thick portion. As a result, in molding both a thick portion 1001 and a small shape portion of the convex portion 1002 in the longitudinal direction of the fθ lens, an excess pressure is applied to the convex portion 1002 that is a small shape portion, and an engagement force 1011 with respect to a mold portion for molding the convex portion 1002 becomes high.

For releasing of the small shape, the force overcoming the engagement force is required.

However, in molding of a rectangular lens that is long in one direction with one end in the longitudinal direction being a gate 1012, such as an fθ lens, as illustrated in FIG. 7B, the lens expands in a longitudinal direction 1010 with the gate 1012 being a binding point during releasing.

Therefore, a contact strength 1007 with respect to a mold member 1006 constituting the movable side cavity is reduced largely (FIG. 7D).

Consequently, large deflection occurs in the side surface direction of the lens due to a sliding 1008 of the side surface slide blocks caused by the keeping of the engagement force 1011.

Due to such deflection, in the case where the concave portions of positioning reference portions are placed in a staggered manner on the lens side surface, the positioning reference 1002 on a side far from the gate 1012 is deflected in a certain direction.

The reason for this is considered as follows: in the case of setting the gate side of a mold used for molding as a fixed point, a force larger than a moment force acts.

In order to restrict the above-mentioned expansion in the longitudinal direction of the lens during releasing, it is most effective to bind the end portion in the longitudinal direction of the lens on a side opposite to the gate side by a mold member 1014 that does not slide, as illustrated in FIG. 7E.

However, when the expansion in the longitudinal direction is restricting, a stress 1015 remains in the fθ lens, and a refractive index becomes non-uniform to influence the optical characteristics.

Therefore, in order to obtain satisfactory optical characteristics, it is necessary to release a residual stress remaining in a molding due to the expansion in the longitudinal direction.

Thus, when a lens that is long in one direction, such as the fθ lens, is molded with a mold, it is necessary to prevent the refractive index from being non-uniform due to the residual internal stress, without impairing a convex or concave shape of a positioning reference placed on the side surface of the lens during releasing.

SUMMARY OF THE INVENTION

In view of the above-mentioned problems, it is an object of the present invention to provide a plastic lens capable of being molded without restricting the expansion of the lens in a longitudinal direction while suppressing the deflection of the lens in a side surface direction, and without impairing the optical characteristics, and a molding mold therefor.

The present invention provides a plastic lens configured as follows, and a molding method and a molding mold therefor.

A plastic lens according to the present invention, which is molded with a mold, includes: an optical surface formed of an incident/output surface in a rectangular shape formed in a direction orthogonal to an optical axis; a long side surface portion that is a side surface in a longitudinal direction adjacent to the optical surface; at least one positioning reference portion as a positioning reference for positioning the plastic lens with respect to another member, formed on the long side surface portion; a gate-side short side surface portion with an injection port for a resin formed therein, which is a short side surface portion that is a side surface in a short direction adjacent to the optical surface; an anti-gate side short side surface portion positioned on an opposite side of the gate-side short side surface portion, which is a short side surface portion that is a side surface in the short direction adjacent to the optical surface; and a deflection suppressing shape portion in one of a convex shape and a concave shape formed on the anti-gate side short side surface portion.

Further, a method of molding a plastic lens, including: supplying a resin through a gate portion to a space surrounded by at least a first slide block for forming short side surface portion (hereinafter, referred to as simply "first slide block") and a second slide block for forming long side surface portion (hereinafter, referred to as simply "second slide block"), wherein the first slide block includes a molding portion for molding a deflection suppressing shape portion, and the second slide block includes a positioning reference portion molding portion for molding a positioning reference portion; and opening a mold by moving the second slide block in a short direction by an amount equal to or more than a dimension in the short direction of the positioning reference portion to release the second slide block from the positioning reference portion completely, and simultaneously, moving the first slide block in a longitudinal direction to release an expansion force in a lens longitudinal direction and holding the deflection suppressing shape portion at the first slide block.

Further, a molding mold for molding a plastic lens, including: a cavity to which a resin is supplied through a gate; a molding piece for forming an optical surface; a second slide block for forming a long side surface portion, which is adjacent to the optical surface in the longitudinal direction, wherein the second slide block includes at least one positioning reference portion molding portion for forming a positioning reference portion as a positioning reference for positioning a plastic lens with respect to another member; and a first slide block for forming a short side surface portion, including a molding portion for forming a deflection suppressing shape portion in one of a convex shape and a concave shape, which is a short side surface portion and is adjacent to the optical surface in the short direction and formed on an opposite side of the gate, wherein the second slide block has a movement amount larger than a dimension in the short direction of the positioning reference portion, and the first slide block has a movement amount smaller than a dimension in the longitudinal direction of the deflection suppressing shape portion.

According to the present invention, it is possible to realize a plastic lens capable of being molded without restricting the expansion of the lens in a longitudinal direction while suppressing the deflection of the lens in a short direction, and without impairing the optical characteristics, and a molding mold therefor.

Further features of the present invention will become apparent from the following description of exemplary embodiments with reference to the attached drawings.

BRIEF DESCRIPTION OF THE DRAWINGS

FIGS. 3A, 3B, and 3C are views illustrating a function of a deflection suppressing shape portion in the fθ lens having a positioning reference portion in a long side surface portion in an embodiment of the present invention.

FIG. 4A is a view seen from the lens long side surface direction, FIG. 4B is a view seen from an optical surface direction, FIG. 4C is a view illustrating a state before releasing, seen from the optical surface direction, and FIG. 4D is a view illustrating a state during releasing, seen from the optical surface direction.

FIG. 5A is a view illustrating a state before releasing, seen from a lens side surface direction, FIG. 5B is a view illustrating a state before releasing, seen from an optical surface direction, FIG. 5C is a view illustrating a state during releasing, seen from a lens long side surface direction, and FIG. 5D is a view illustrating a state during releasing, seen from the optical surface direction.

FIGS. 7A, 7B, 7C, 7D, and 7E are views illustrating problems regarding releasing defects of an fθ lens molded by a mold in a conventional example.

DESCRIPTION OF THE EMBODIMENTS

Figure 1A:
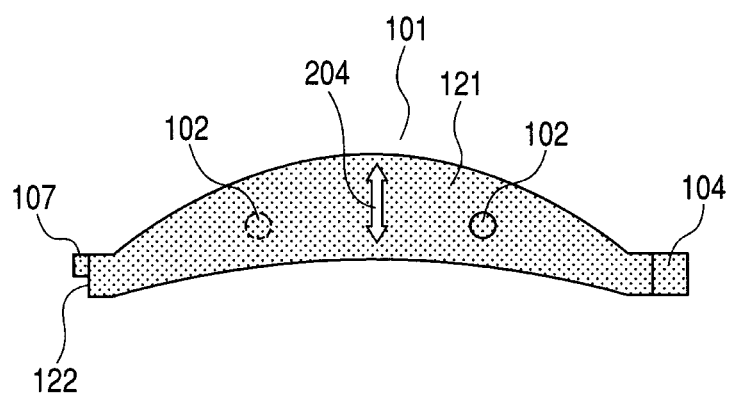
FIG. 1A is a view illustrating a configuration of an fθ lens having a positioning reference portion by a convex portion in an embodiment seen from a long side surface direction.

Hereinafter, preferred embodiments of the present invention are described. In the figures illustrating configurations of the respective embodiments, common configurations are denoted with the same reference numerals.

Embodiment 1

First, one embodiment of a plastic lens, in which an incident/output surface in a rectangular shape that is long in a direction orthogonal to an optical axis, of the present invention is described with reference to FIG. 1.

Figure 1B:
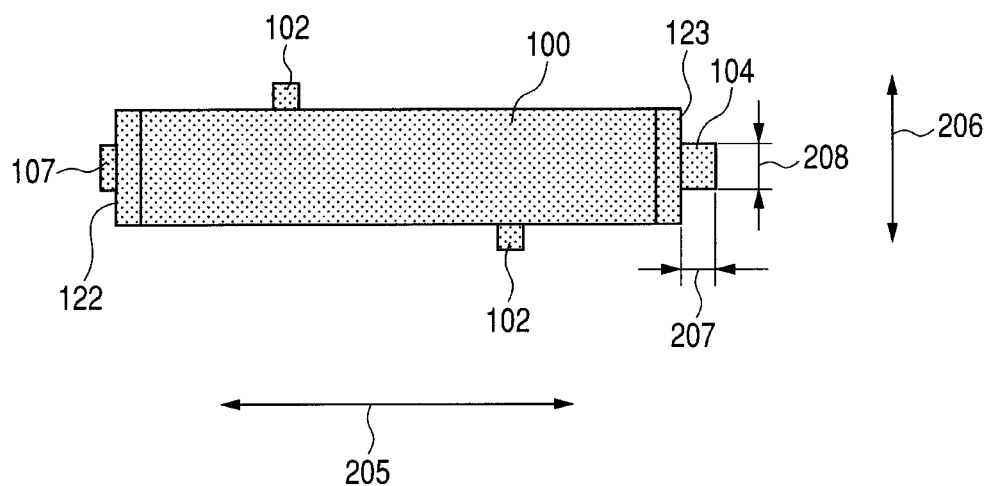
FIG. 1B is a view illustrating a configuration of the fθ lens of FIG. 1A seen from an optical surface direction.

FIG. 1A is a side view illustrating one embodiment of the plastic lens of the present invention, and FIG. 1B is a top view thereof. The plastic lens of the present invention is used as an fθ lens for causing a light beam from a light source to scan by a light deflector and focusing the light beam in a spot shape on an image-forming surface on a photosensitive drum in a scanning optical apparatus such as a laser printer or a digital copier.

Figure 2A:
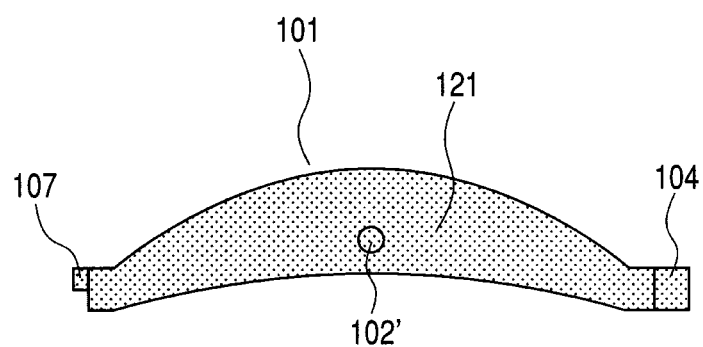
FIG. 2A is a view illustrating a configuration of the fθ lens having a positioning reference portion by a concave portion in an embodiment seen from the long side surface direction.
Figure 2B:
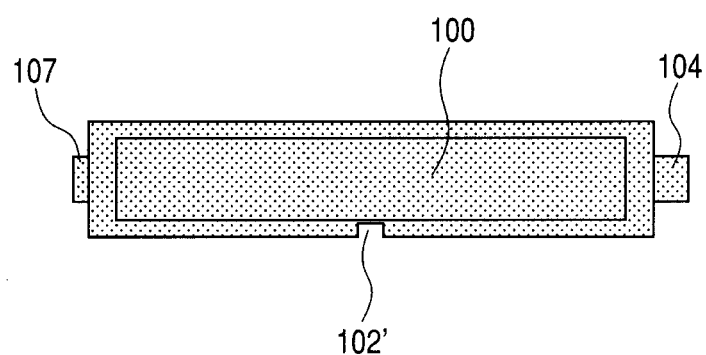
FIG. 2B is a view illustrating a configuration of the fθ lens of FIG. 2A seen from the optical surface direction.
Figure 4A:
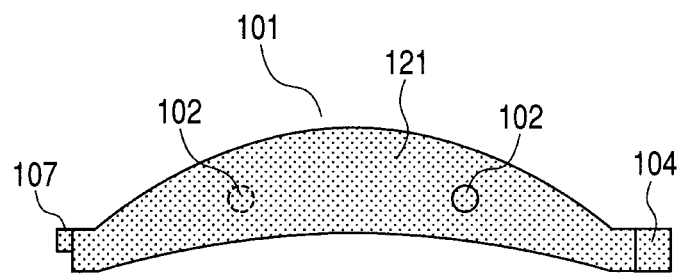
FIGS. 4A, 4B, 4C, and 4D are views illustrating a configuration example in which a deflection suppressing shape portion of Embodiment 2 of the present invention is offset in a lens short direction.
Figure 4B:
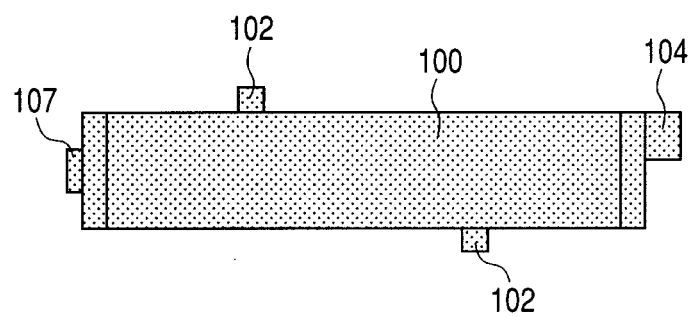
Figure 4C:
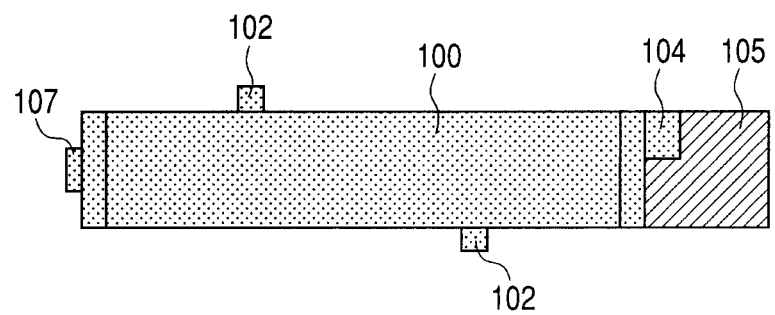
Figure 4D:
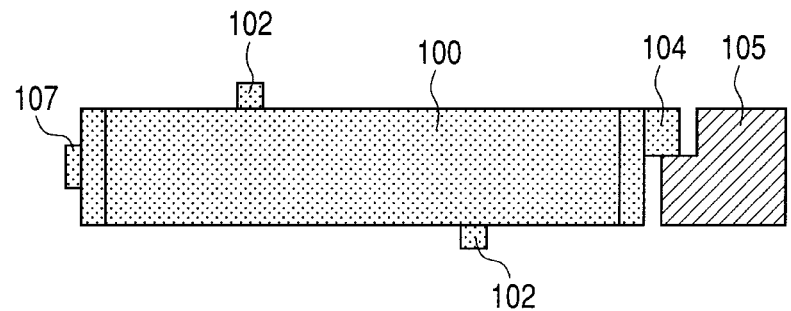

In this embodiment, an arrow 204 denotes an optical axis, and a direction 205 is referred to as a longitudinal direction and a direction 206 is referred to as a short direction. An optical surface 100 is an incident/output surface in a rectangular shape formed in the direction orthogonal to the optical axis, and a long side surface portion 121 is a side surface in the longitudinal direction. The long side surface portions are formed on both surfaces with the optical surface interposed therebetween. A gate 107 is used for injecting a resin when molding a plastic lens. A gate-side short side surface portion 122 is a side surface in the short direction on the gate side, and an anti-gate side short side surface portion 123 is a side surface in the short direction on an opposite side of the gate. The long side surface portion is provided with at least one positioning reference portion 102 that protrudes in a direction orthogonal to the optical axis. The positioning reference portion 102 is required for positioning in the longitudinal direction with respect to the scanning optical apparatus body, for example, in the case of the fθ lens. In FIG. 1, the positioning reference portion has a convex shape. However, as illustrated in FIGS. 2A and 2B, the long side surface portion may have at least one concave portion 102' that recedes in the direction orthogonal to the optical axis. The anti-gate side short side surface portion 123 has a deflection suppressing shape portion 104 that is a convex portion protruding in a direction parallel to the longitudinal direction.

Then, in the case of molding an fθ lens 101 having the positioning reference portions, the convex portion that is the deflection suppressing shape portion 104 is formed in the direction parallel to the longitudinal direction (in the same direction as the longitudinal direction) in the other end portion on the opposite side in the longitudinal direction, to be the anti-gate side.

Next, one embodiment of a mold for molding a long optical element of the present invention and a method of molding a long optical element of the present invention is described with reference to FIGS. 3A to 3C. FIGS. 3A to 3C illustrate the behavior from a movable side parting direction during releasing of a molding mold for molding the fθ lens in one embodiment of the long optical element of the present invention.

FIG. 3A is a view of an embodiment in which two convex portions are molded as the positioning reference portions 102, illustrating a relationship between a molding and slide blocks during mold opening. FIG. 3B illustrates an embodiment in which one concave portion is molded as the positioning reference portion 102'. A first slide block 105 and a second slide block 106 are used. When the mold is closed, a space surrounded by the first slide block 105, the second slide block 106, and a molding piece for molding the optical surface becomes a cavity. A resin is supplied from the gate 107 through a runner 108, and thus, a plastic lens that is a long optical element of the present invention is molded. The second slide block 106 is used for forming the long side surface portion of the long optical element, and has a positioning reference portion molding portion 103 for molding the convex positioning reference portion 102. Alternatively, the second slide block 106 has a positioning reference portion molding portion 103' for molding the concave positioning reference portion 102'. During mold opening, the second slide block 106 moves in the short direction 206 to leave the long side surface portion 121 to obtain a state illustrated in FIGS. 3A and 3B. The second slide block 106 may be moved by an angular pin, etc. or driving means such as a cylinder. The second slide block 106 is configured so as to move a distance longer than a stroke required for the positioning reference portions 102, 102' placed on the long side surface portion to be released completely from the second slide block 106. That is, the second slide block 106 is configured so as to move a distance equal to or longer than a dimension of the positioning reference portion 102 in the short direction (equal to or more than a protrusion amount), and so as to move a distance equal to or longer than the positioning reference portion 102' in the short direction (equal to or more than a dented amount). The dimension of the positioning reference portion 102 is set 2 mm to 3 mm in most cases. Thus, the movement distance of the second slide block 106 in the short direction is preferably 3 mm to 6 mm. It is not preferred to set the movement distance more than necessary, because a mold is enlarged.

The first slide block 105 is used for forming the short side surface portion of the long optical element and has a concave portion dented in the direction parallel to the longitudinal direction. The concave portion is a molded portion for molding the deflection suppressing shape portion 104 that protrudes in the direction parallel to the longitudinal direction. The first slide block 105 moves in the longitudinal direction 205 during mold opening to obtain a state illustrated in FIGS. 3A and 3B. This movement releases the expansion force in the lens longitudinal direction so that a residual stress is not accumulated in the lens and the deflection suppressing shape portion 104 is prevented from being pulled out of the first slide block 105 completely. The first slide block 105 has a configuration of sliding with the expansion force in the longitudinal direction of the lens 101 during mold opening. Specifically, as an example, by forming an end portion in a tapered shape, the first slide block 105 is fixed with a clamping force during clamping, and thus, molding is performed. During mold opening, the clamping force is released, and the first slide block can move freely at least in the longitudinal direction and can slide with the expansion force in the longitudinal direction. Regarding the first slide block 105, the following two forms can be considered: the first slide block 105 slides with the expansion force in the longitudinal direction of the long optical element as in this embodiment; and the first slide block 105 is slid forcefully by an angular pin, etc.

In any form, the first slide block 105 moves in the longitudinal direction 205 during mold opening and releases the expansion force in the lens longitudinal direction so that a residual stress is not accumulated in the lens. However, until the positioning reference portions 102, 102' placed in the long side surface portion are released completely from the second slide block 106, the deflection suppressing shape portion 104 is configured so as not to be pulled completely from the first slide block 105. In other words, during mold opening, until the positioning reference portions 102, 102' placed on the long side surface portion are released completely from the second slide block 106, the deflection suppressing shape portion 104 is held at the first slide block 105.

Next, the deflection suppressing shape portion 104 is described in detail with reference to FIG. 3C.

In order for the positioning reference portion 102 or 102' placed on the long side surface portion of the fθ lens 101 that is the long optical element to obtain rigidity withstanding the deflection force in the side surface direction caused by the engagement with the second slide block 106, the following is required.

That is, it is necessary that at least a part of the deflection suppressing shape portion 104 be bound by the first slide block 105 until the positioning reference portions 102, 102' placed on the long side surface portion of the fθ lens 101 are released completely from the second slide blocks 106. In order for at least a part of the deflection suppressing shape portion 104 to be held by the first slide block 105, it is preferred that the dimension of the deflection suppressing shape portion 104 be 1 mm or more in a longitudinal direction 207 illustrated in FIG. 1B and 6 mm or more in the short direction 208. When the interference with other components is considered in the attachment to the scanning optical apparatus, the deflection suppressing shape portion 104 is required to be as small as possible. However, when the dimension of the convex portion 107 in the longitudinal direction is too small, the rigidity with respect to a deflection force 113 in the lens side surface direction cannot be held, which deforms the convex portion by peeling. In some cases, the fitting is cancelled, and consequently, desired effects cannot be obtained with respect to the deflection of the lens side surface.

In particular, the rigidity cannot be obtained with a dimension of 1 mm or less in the longitudinal direction, and the deflection suppressing shape portion 104 is deformed by peeling. As a result, there is a possibility that a binding force enough for withstanding the deflection force in the lens short direction cannot be obtained.

Further, it is also necessary to adjust the stroke amount of the first slide block 105. The reason for this is that the expansion force in the lens longitudinal direction is released by the first slide block 105 to prevent a residual stress from being accumulated in the lens. A stroke amount 112 in the longitudinal direction of the first slide block 105 equal to or more than the expansion amount in the lens longitudinal direction is not required. The dimension of the fθ lens 101 for a laser beam printer in the longitudinal direction is at most about 250 mm. The expansion amount during releasing in this case is at most 1 mm. Thus, about 1 mm of the stroke amount 112 in the longitudinal direction of the slide block 105 is sufficient for releasing the expansion force in the lens longitudinal direction. Further, in order to ensure the rigidity withstanding the deflection force in the lens side surface direction, the fitting length 111 of about 1 mm is required.

Considering 1 mm for keeping the rigidity with respect to the lens side surface deflection force and 1 mm for the stoke amount 112 in the longitudinal direction of the slide block 105 for releasing the expansion in the lens longitudinal direction, the dimension in the longitudinal direction 207 of the deflection suppressing shape portion 104 of, for example, 1 mm or more to 2 mm or less brings about sufficient effects.

Accordingly, the deflection force 113 is generated in the lens side surface direction during releasing due to the engagement of the positioning reference convex portion 102 with the second slide block 106. However, due to a reaction force 114 in the lens side surface direction by the deflection suppressing shape portion 104 placed on the anti-gate side, the lens can be held. Then, by creating a state in which deflection is not caused in the lens side surface direction (short direction), the positioning reference convex portion 102 in the longitudinal direction on the lens side surface can be released from the side surface slide block stably without an eclipse and tearing.

Further, the interference with a mold member constituting a movable side cavity can be avoided to prevent a molding from being scarred.

As described above, for designing the shape of the deflection suppressing shape portion 104, it is necessary to design the deflection suppressing shape portion 104 so as to obtain rigidity withstanding the expansion amount in the longitudinal direction of an angular lens and the deflection force in the lens side surface direction. By forming the deflection suppressing shape portion 104, the deflection suppressing shape portion 104 holds the fθ lens 101 in the side surface direction to cause a binding force during releasing, and hence, the deformation of the fθ lens 101 can be prevented.

Then, the deflection force 113 caused by the engagement of the convex portion 102 that is the positioning reference on the second slide block 106 of the fθ lens 101 can be suppressed. Here, although the case where the positioning reference portion has a convex shape is described, the same effects can be obtained even when the positioning reference portion has a concave shape (for example, FIGS. 2A and 2B).

Further, here, the case where the deflection suppressing shape portion 104 is formed of the convex portion is described. However, the present invention is not limited thereto, and for example, even when the deflection suppressing shape portion 104 is formed of a concave portion, the same effects can be obtained.

Embodiment 2

As a second embodiment, a configuration example in which the deflection suppressing shape portion 104 is offset in a lens short direction is described with reference to FIGS. 4A to 4D.

The deflection suppressing shape portion 104 provided on the anti-gate side short side surface portion is offset to any one of long side surface portion sides, instead of being provided at the center of the anti-gate side short side surface portion. That is, the deflection suppressing shape portion 104 is offset in the short direction. With such a configuration, the interference with a laser beam in the scanning optical apparatus can be prevented, and desired effects in the present invention can be obtained.

Embodiment 3

As a third example, a configuration example in which the second slide block in the lens longitudinal direction is slid forcefully by an angular pin is described with reference to FIGS. 5A to 5D.

Figure 5A:
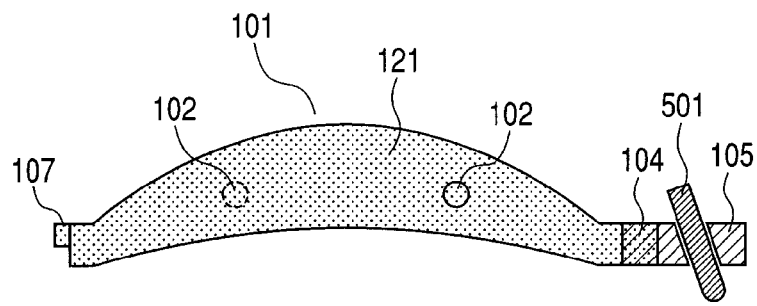
FIGS. 5A, 5B, 5C, and 5D are views illustrating a relationship with a slide block in the longitudinal direction, forming a deflection preventing shape, which is forced to slide by an angular pin in an embodiment of the present invention.
Figure 5B:
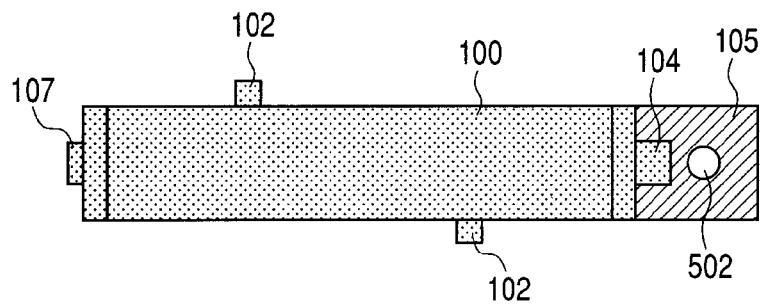
Figure 5C:
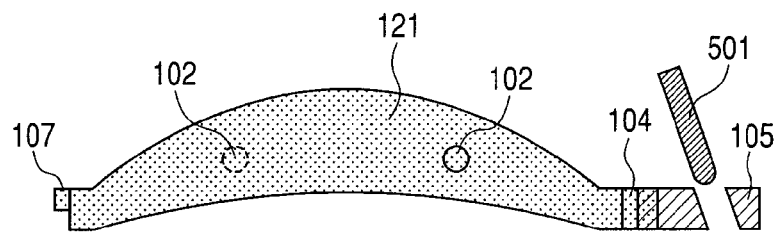
Figure 5D:
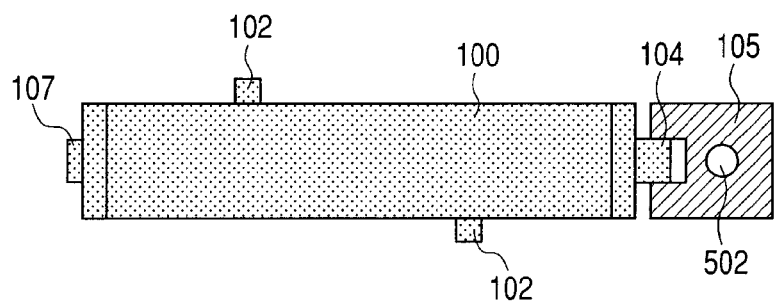
Figure 6A:
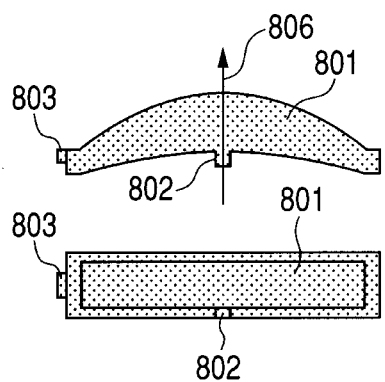
FIGS. 6A, 6B, 6C, 6D, 6E, and 6F are views illustrating a configuration of a positioning reference portion in an fθ lens in a conventional example.
Figure 6D:
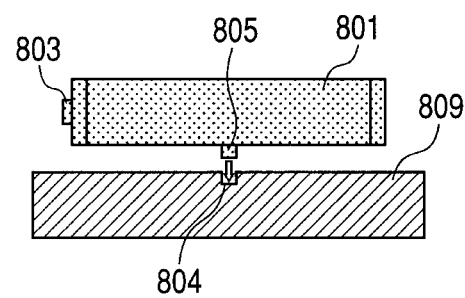
Figure 6B:
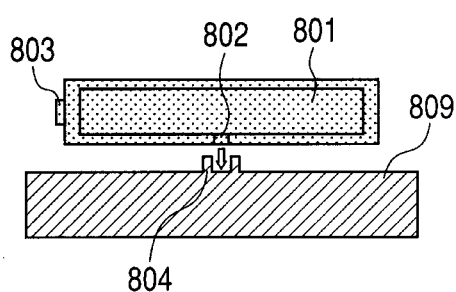
Figure 6E:
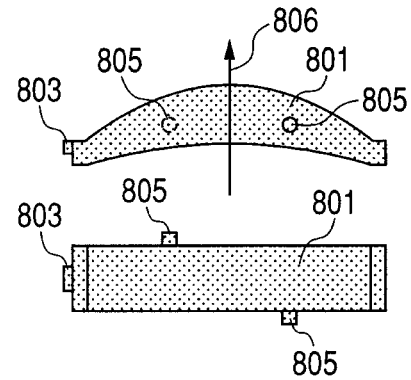
Figure 6C:
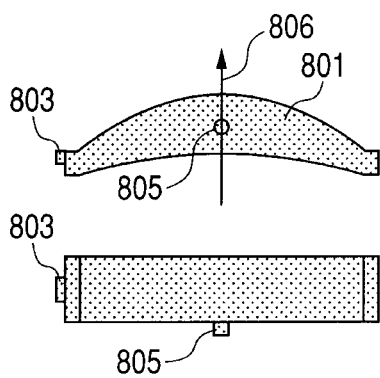
Figure 6F:
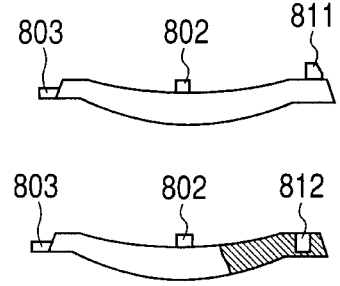
Figure 7A:
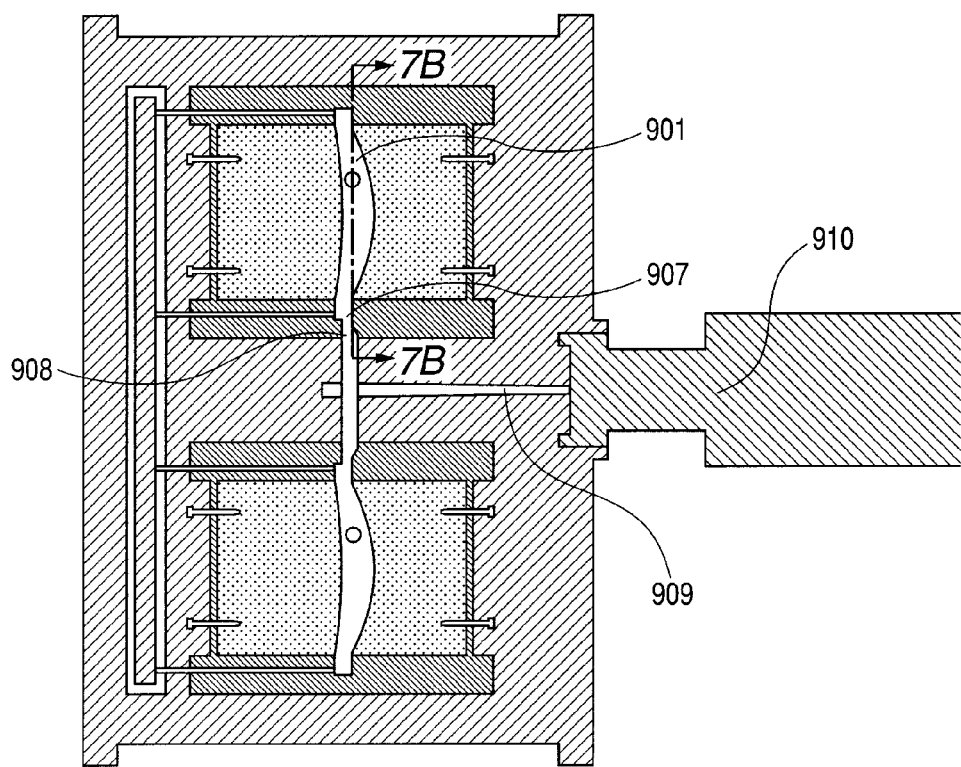

As illustrated in FIGS. 5A to 5D, even in a form in which the second slide block is slid forcefully by an angular pin 501, the optical element can withstand the deflection force in the lens side surface direction (short direction) because a fitting portion parallel to the longitudinal direction is set at 1 mm or more, and thus, the inconveniences described in Embodiment 1 can be handled. The angular pin can be configured using a known technology. A slanted through-hole 502 is formed in the first slide block 105, and the angular pin 501 is inserted into the through-hole 502 in a slanted manner, and the angular pin is moved in the mold opening direction at the same time of the mold opening (FIG. 5C). This enables the first slide block 105 to move in a direction away from the short side surface portion of the lens that is a molding (FIG. 5D).

The configuration using such an angular pin can be applied to any of the case where the positioning reference portion formed on the lens side surface is formed of a convex portion and the case where the positioning reference portion formed on the lens side surface is formed of a concave portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-030066, filed Feb. 15, 2010, which is hereby incorporated by reference herein in its entirety.

What is claimed is:

1. A method of molding a plastic lens, comprising:
supplying a resin through a gate portion to a space surrounded by at least a first slide block for forming a short side surface portion opposite to the gate portion, a second slide block for forming a long side surface portion, and a molding piece for molding an optical surface,
wherein the first slide block includes a molding portion for molding a protruded shape portion, and
wherein the second slide block includes a molding portion for molding a positioning reference portion; and
opening a mold by moving the second slide block in a short direction to release the second slide block from the positioning reference portion completely, and simultaneously, moving the first slide block in a longitudinal direction to release an expansion force in a lens longitudinal direction and holding the protruded shape portion at the first slide block until the positioning reference portion is released completely from the second slide block.

2. The method of molding a plastic lens according to claim 1, wherein the first slide block is moved by natural expansion in the longitudinal direction of the plastic lens at a time of the mold opening.

3. The method of molding a plastic lens according to claim 1, wherein a movement distance in the short direction of the second slide block is 3 mm or more to 6 mm or less, and a movement distance in the longitudinal direction of the first slide block is 1 mm or more to 2 mm or less.

4. The method of molding a plastic lens according to claim 1, wherein the first slide block is moved by an angular pin in the longitudinal direction of the plastic lens at a time of the mold opening.

5. A method of molding a plastic lens, comprising:
supplying a resin through a gate portion to a space surrounded by at least a first slide block for forming a short side surface portion opposite to the gate portion, a second slide block for forming a long side surface portion, and a molding piece for molding an optical surface,
wherein the first slide block includes a molding portion for molding a concave shape portion, and
wherein the second slide block includes a molding portion for molding a positioning reference portion; and
opening a mold by moving the second slide block in a short direction to release the second slide block from the positioning reference portion completely, and simultaneously, moving the first slide block in a longitudinal direction to release an expansion force in a lens longitudinal direction and holding the concave shape portion at the first slide block until the positioning reference portion is released completely from the second slide block.

6. The method of molding a plastic lens according to claim 5, wherein the first slide block is moved by natural expansion in the longitudinal direction of the plastic lens at a time of the mold opening.

7. The method of molding a plastic lens according to claim 5, wherein a movement distance in the short direction of the second slide block is 3 mm or more to 6 mm or less, and a movement distance in the longitudinal direction of the first slide block is 1 mm or more to 2 mm or less.

8. The method of molding a plastic lens according to claim 5, wherein the first slide block is moved by an angular pin in the longitudinal direction of the plastic lens at a time of the mold opening.

* * * * *